(12) United States Patent
Gill et al.

(10) Patent No.: US 6,310,024 B1
(45) Date of Patent: Oct. 30, 2001

(54) RUST AND SCALE REMOVAL COMPOSITION AND PROCESS

(75) Inventors: Jasbir S. Gill, McKees Rocks; Monica A. Yorke, Coraopolis, both of PA (US)

(73) Assignee: Calgon Corporation, Naperville, IL (US)

( * ) Notice: Subject to any disclaimer, the term of this patent is extended or adjusted under 35 U.S.C. 154(b) by 0 days.

(21) Appl. No.: 09/534,807

(22) Filed: Mar. 24, 2000

Related U.S. Application Data
(60) Provisional application No. 60/126,544, filed on Mar. 26, 1999.

(51) Int. Cl.$^7$ ................................ C11D 1/72; C11D 7/04
(52) U.S. Cl. ..................... 510/247; 510/218; 510/234; 510/245; 510/253; 510/255; 510/261; 510/363; 510/398; 510/401; 510/405; 510/421; 510/434; 510/477; 510/480
(58) Field of Search .................... 510/218, 234, 510/245, 247, 253, 255, 261, 363, 398, 401, 405, 421, 434, 477, 480

(56) References Cited

U.S. PATENT DOCUMENTS

| | | | |
|---|---|---|---|
| 3,806,459 | 4/1974 | Petrey, Jr. | 252/82 |
| 4,190,463 | 2/1980 | Kaplan | 134/3 |
| 4,279,768 | 7/1981 | Busch | 252/180 |
| 4,664,811 | 5/1987 | Operhofer | 210/673 |
| 5,022,926 | 6/1991 | Kreh et al. | 134/2 |
| 5,037,483 * | 8/1991 | Dubin | 134/3 |
| 5,171,477 | 12/1992 | Kreh | 252/389.23 |
| 5,183,573 | 2/1993 | Kreh et al. | 210/697 |
| 5,223,146 | 6/1993 | Kreh | 210/698 |
| 5,350,536 | 9/1994 | Chen et al. | 252/180 |

FOREIGN PATENT DOCUMENTS

| | | |
|---|---|---|
| 0 313 335 A1 | 4/1989 | (EP) . |
| 0 544 345 A1 | 6/1993 | (EP) . |
| 0 892 040 A2 | 1/1999 | (EP) . |
| PL-56344 | 11/1968 | (PL) . |

OTHER PUBLICATIONS

"Silica in Water in Relation to Cooling Tower Operation", Cornel Wohlberg & Jerry R. Buchholz, for los alamos scientific laboratory of the University of CA, issued: 10/73, pp i&ii and pp. 1–22.

\* cited by examiner

*Primary Examiner*—Yogendra N. Gupta
*Assistant Examiner*—Charles Boyer
(74) *Attorney, Agent, or Firm*—Margaret M. Brumm; Thomas M. Breininge

(57) ABSTRACT

Disclosed in the present application is a composition that is useful for rust and/or corrosion removal that contains a reducing agent, a chelating agent, a surfactant, and a dispersant. Disclosed also are processes for using this composition in aqueous systems and metal surface treatment.

14 Claims, No Drawings

RUST AND SCALE REMOVAL COMPOSITION AND PROCESS

CROSS-REFERENCE TO RELATED PATENT APPLICATIONS

This application claims priority from U.S. Provisional Patent Application No. 60/126,544 filed Mar. 26, 2999.

FIELD OF THE INVENTION

The present invention relates to a composition and method of using a composition in rust and/or scale removal.

The present invention more particularly relates to a composition that can be used for the removal of rust and/or scale from metal surfaces under safe conditions. Further, the present invention relates to a method of treating an aqueous system with a combination of components to remove rust and/or scale deposits from iron/iron alloy metal surfaces of the aqueous a system. More particularly the present invention relates to a simple, safe process with one treatment step to remove rust and/or scale deposits from metal surfaces without the use of strong acids while leaving a stable passivated magnetite coating.

BACKGROUND OF THE PRESENT INVENTION

It is known that aqueous systems, particularly industrial aqueous systems such as boiler systems, cooling tower systems, heat exchanger systems, desalination systems, paper mills, heating/cooling systems, fire service water, reactors, and the like are subject to the formation of deposits on the internal surfaces which are in contact with the circulating water. The removal of scale and iron oxide deposits, which arise either from the chemical reaction of the water with the metal surfaces of the system's piping and other parts, as well as from being present in certain water supplies, is necessary to prevent "under deposit corrosion" of metallic surfaces and for the maintenance of clean heat transfer surfaces to assure good thermal efficiency. A buildup of metal oxide will affect the rate of heat transfer, will cause the pipes to become clogged (limiting flow) and, in general, add to the corrosive aspect of the water. A metal surface which is exposed to a corrosive environment, such as water which contains dissolved oxygen and dissolved ionic inorganic solids will be subject to corrosion under the deposits of solids that form on the metal. If the deposits are not removed, under deposit corrosion can penetrate through the metal, breaching the containment. Once this occurs, fluid starts leaking from the system and the system must be taken off line and this portion of the system must be repaired or replaced.

A number of approaches have been attempted to create an effective rust and/or scale cleaner. The use of chelating agents or chelants are known for their ability to remove particular cations such as iron. Also, chelants tend to be somewhat specific with respect to which cations they will complex with and under what conditions. As disclosed in U.S. Pat. No. 5,183,573, the disclosure of which is incorporated herein in its entirety by reference, chelants function by essentially "locking" the metal into a soluble organic ring structure. The use of chelants, such as ethylene diamine tetraacetic acid (EDTA), along with dispersants is well known for removing iron, because iron has six coordination sites as does EDTA and iron is removed by EDTA since it forms a stable metal chelant with iron. This approach often results in clean waterside surfaces. However, the greatest drawback to this approach is that the reaction that removes oxidized metal is not self-terminating. The chelant will continue to dissolve the surface metal even after the corroded oxide coating is removed. This can lead to a very serious problem, the problem the cleaner was to prevent, i.e. perforation of the metal leading to tube failure or joint leaks. An attempt to solve this problem is disclosed in U.S. Pat. No. 5,171,477, the disclosure of which is incorporated herein in its entirety by reference.

Another approach is using high concentrations of aminoalkylphos-phonates, but these cleaners are expensive and leave a fresh metal surface which "flash rusts" leaving a thin film of the very oxide which was just removed. Disposal also becomes a problem with these cleaners in areas where phosphate discharge limits are legislated. The use of a carboxyalkyl, aminoalkyl hydroxyaryl sulfonic acid is also available, but this cleaner requires long time periods, i.e. weeks, to be effective. Organic compounds, such as hydroquinone and quinone have been used as iron oxide dispersants at high doses, but their cost is prohibitive and their use is restricted to alkaline pH ranges. Acid cleaners, such as, muriatic acid, sulfamic acid, etc. have been used, but the low pH's at which these agents work is hazardous and also presents disposal problems.

Methods of treating or removing iron contaminants, such as iron oxide, from aqueous systems are also disclosed in the following U.S. Pat. Nos. 3,806,459; 4,190,463; 5,022,926; and 5,223,146.

It would be very desirable to be able to quickly remove scale and/or rust deposits from metal surfaces under safe conditions without the use of strong acids. It would also be desirable to be able to remove scale and/or rust deposits from metal surfaces without the risk of perforating the metal wall of the system. Further, it would be desirable to be able to remove scale and/or rust deposits from metal surfaces while leaving a stable protective coating.

SUMMARY OF THE INVENTION

The present invention relates to a composition that is useful in rust, corrosion and/or scale removal that comprises: a) an inorganic reducing agent; b) a chelating agent; c) a low foam penetrating surfactant; d) a water soluble polymeric dispersant selected from anionic and nonionic polymers; and e) water.

The present invention also relates to a process of treating aqueous systems that contain metal surfaces by introducing the above composition into said systems.

The present invention further relates to a method of treating metal surfaces in preparation for coatings that comprises applying the composition above in an aqueous form to a metal surface.

DETAILED DESCRIPTION OF THE INVENTION

The composition of the present invention is a novel unexpected composition. Prior to the present invention reducing agents were heretofore unknown for use in rust, corrosion and/or scale removal in water systems, particularly in combination with the other components of the present composition. Prior to the present invention it was not known that a composition containing an inorganic reducing agent; a chelating agent; a low foam penetrating surfactant; and a water soluble polymeric dispersant would be an improvement in rust, corrosion and/or scale removal in water systems.

The composition and process according to the present invention takes advantage of the right combination of factors to provide improvement in rust, corrosion and/or scale removal in water systems. Since deposition is a process involving any or all of the following: formation of corrosion products, scale or the water born silts and biofilms formation, the cleaning of the deposit according to the present invention takes into account all of the contributing factors.

The present invention is a dramatic improvement over the art and the inventors have unexpectedly discovered that the reducing agent serves to convert the iron oxide to a more soluble form and to transform the pipe metal surface to a less reactive state by forming a magnetite coating on the surface. The penetrant serves to remove the biofilm residues which act as a glue entrapping metal oxide, silt, scale, and/or biological particles on the metal surface. The dispersant also helps to suspend iron oxide and silt particles in the bulk water, preventing re-deposition onto the metal surfaces, while the chelant helps hold some of the soluble metal in solution preventing re-oxidation and re-deposition onto the metal surface.

The composition of the present invention is able to quickly and inexpensively remove scale and/or rust deposits from metal surfaces under safe conditions without the use of strong acids and is thus a more environmentally friendly process. The cleaning time with the composition of the present invention can be in hours rather than the days it takes with some conventional products (non-acid products). The aqueous system is emptied of its contents for cleaning and the composition of the present invention is introduced in a one step application process and circulated though the pipes and containers of the system. This application is followed by removal of the product and entrained contaminants, and the system is rinsed with water and filled with system water.

The treatment time is dosage dependent, i.e., the more concentrated the solution, the quicker it cleans. This time can be as short as several hours and as long as several days, as short as 6 hours and as long as 10 days, depending upon dosage and degree of fouling. At low concentrations, it is generally preferable to keep the system on line after charging the inventive composition.

The composition of the present invention unexpectedly removes scale and/or rust deposits from metal surfaces without the risk of perforating the metal wall of the system. Further, the composition of the present invention unexpectedly removes scale and/or rust deposits from metal surfaces while leaving a stable protective coating of magnetite so that system does not "flash rust" once the new system water is reintroduced.

This composition cleans and removes the metal oxide and passivates the surface at the same time.

The composition of the present invention comprises: a) an inorganic reducing agent; b) a chelating agent; c) a low foam penetrating surfactant; d) a water soluble polymeric dispersant selected from anionic and nonionic polymers; and e) water.

A reducing agent is a material that readily gives up electron(s) to another element or compound, causing it to be reduced. This reducing agent causes a metal cation of a higher charge to accept an electron, and consequently, assume a lower cationic charge. In the case of iron, the ferrous form is much more soluble than the ferric. It is easily chelatable, and/or dispersible. Therefore, by adding sufficient amounts of the inorganic reducing agents according to the process of the present invention, the iron (III) oxides are reduced to the iron (II) state, allowing the formation of magnetite and chelates.

Reducing agents that are useful in the composition and process of the present invention are those that are selected from the group of inorganic reducing agents consisting of sulfites (including hydrogen sulfites), thiosulfates, persulfates, and peridates, including the ammonium, potassium, or sodium salts thereof. Sulfite inorganic reducing agents are preferred, with sulfite inorganic reducing agents selected from the group consisting of bisulfites and metasulfites being more preferred. The more preferred are the salts of hydrogen sulfites, with sodium bisulfite and sodium hydrogen sulfite being most preferred.

Chelating agents are organic compounds in which atoms form more than one coordinate bond with metals in solution. The presence of a chelant according to the present invention allows some of the reduced iron to be held in solution preventing re-deposition onto the surface. The Chelants in the process of the present invention function by "locking" the metal ion into a soluble organic ring structure. The chelant can also solubilize unreacted iron (Fe III) as well as the reduced iron (Fe II).

Chelating agents of the present invention are preferably selected from the group consisting of phosphonates and polycarboxylic acids (including polyamino carboxylic acids), and are more preferably selected from the group consisting of ethylene diamene tetraacetic acid (EDTA), maleic acid, oxalic acid, citric acid, and their salts, with the more preferred chelants being salts of EDTA and of citrates with the most preferred being salts of EDTA for most effective use of a chelant in the neutral pH range. Due to cost and efficacy, the sodium salt of ETDA is most preferred.

The iron ions and EDTA combine to form strong stable complexes. In a pH range of 5–7. Nitrilotriacetic acid (NTA), and citric acid are also chelants with fewer coordination cites than EDTA that form complexes with iron, although not as strongly as does EDTA.

The literature shows that biofilms, first, form on a surface and create polysaccharides which act as a glue to attach particles of corrosion products, silt or scale to the metal surfaces of piping, heat exchangers, etc.

The low foam penetrant surfactants of the present invention, are liquids with low surface tension, and serve the purpose of infiltrating and dislodging biofilms. They create pathways for the reducing agent to get beneath the surface of the iron deposit, allowing sloughing of the iron oxide solids from the metal surface. Low foam penetrating surfactants are preferably nonionic and are preferably selected from the group consisting of ethylene oxide polymers, propylene oxide polymers, ethylene oxide/propylene oxide copolymers, alkyethoxylated alcohols and alkyethoxylated ethers. Alternatively they can be of any of the following forms: modified polyethoxylated alcohol, ethoxyl-propoxyl block copolymers, aliphatic polyethers, alkyl polyoxyalkylene ether, phosphate ester of nonionic surfactant, etc. Said low foam penetrating surfactant is more preferably selected from the group consisting of ethylene oxide/propylene oxide block copolymers (e.g., PLURONIC P-103 from BASF, Wyndot, Mich.) and polyethoxylated alkylated alcohols, with the polyalkoxylates (e.g. TRITON DF-16 from Union Carbide Chemicals and Plastics Company, Inc. of Danbury, Conn.) being most preferred.

The term "low foam" when referring to the low foam penetrating surfactant means that at the preferred operating conditions. This component does not cause appreciable foam that would significantly fill a portion of the system with foam instead of product damaging recirculating pumps. This means that a container of this composition at the concentrations in the aqueous system at the operating conditions under agitation would not form a head of foam larger than about one inch. In some instances, at low temperature with many types of the low foam penetrating surfactants, no foam will form.

The term "penetrating" when referring to the low foam penetrating surfactant means that at the preferred operating conditions this low foam penetrating surfactant will penetrate through the biofilm to permit dislodging of the biological constituents and corrosion particles from the metal surface.

The low foam penetrating surfactant also preferably has a hydrophobic lipophobic balance (HLB) between about 6 and about 15.

The composition according to the present invention preferably contains and additional component called a hydrotrope that aids in dispersing the low foam penetrating surfactant. This hydrotrope is preferably selected from the group consisting of phosphate esters, phosphated alcohol ethoxylate, phosphated linear alcohol, phosphated alkylphenol ethoxylates. The most preferred hydrotropes are phosphated alkylphenol ethoxylated such as TRITON H-66 from Union Carbide Chemicals and Plastics Company Inc. of Danbury, Conn.

A dispersant is a material capable of holding particles in suspension. The water soluble polymeric dispersant of the present invention are used primarily to disperse iron solids into the bulk water, preventing re-deposition onto the metal surface. The broad class of Dispersants are not exclusively, polymeric. Those that are polymeric are useful in the present invention. The water soluble polymeric dispersant preferably has a weight average molecular weight ranging from about 500 to about 50,000 (preferably 500 to 25,000) and is selected from the group consisting of the homopolymers, copolymers, and terpolymers of the monomers acrylamide; acrylic acid; methacrylic; 2-acrylamido-2-methyl propylsulfonic acid; 3-acrylamido-2-methyl propylsulfonic acid; 2-hydroxy propylacrylate; sulfonated styrene; itaconic acid; polyethylene glycol mono methacrylate; t-butylacrylamide; vinyl sulfonate; hydroxypropyl acrylate; 3-allyloxy-2-hydroxy propylsulfonic acid; vinyl phosphonic acid; sulfophenoxy methallyl ether; maleic acid; and salts thereof. Examples of these types of polymers are disclosed in U.S. Pat. No. 5,300,231, the disclosure of which is incorporated herein in its entirety by reference. The more preferred water soluble polymeric dispersant is selected from the group consisting of copolymers and terpolymers of acrylic acid/ 3-acrylamido, 2-methyl propyl sulfonic acid; acrylic acid/ sulfonated styrene; and acrylic acid/sulfophenoxy methallyl ether/maleic acid, and salts thereof.

Examples of the more effective water soluble polymeric dispersants include: 1) terpolymers of acrylic acid (AA)/ sulfo phenoxy methallyl ether (SPME)/maleic acid (MA), with AA:SPME:MA ratio ranging from 95:2.5:2.5 to 50:25:25, most preferred ratio ranging from 90:5:5 to 80:10:10 (AR 540 from Alco Chemical Company of Chattanooga Tenn.), and 2) copolymers of A) acrylic acid/3-acrylamido,2-methyl propane sulfonic acid (AMPS), with ratio of AA:AMPS to be from 90:10 to 10:90, more preferred being from 80:20 to 20:80, with from 60:40 to 40:60, being most preferred B) copolymers of acrylic acid/ sulfonated styrene (SS), with ratio of AA:SS ranging from 90:10 to 10:90, more preferred being from 80:20 to 20:80, with 70:30 to 30:70 being most preferred. Furthermore, the molecular weight ranges of these polymers range from 2,000 to 50,000, most preferably being 4,000 to 20,000.

The composition according to the present invention is in the form of an aqueous dispersion when it is applied to the aqueous systems in the process of the present invention. The solids, a), b), c), and d) of the composition are present in a concentration of about 0.1 to about 40 weight %, the remainder being water e). The composition of the present invention is preferably added to the system to be cleaned from a more concentrated dispersion and then diluted with water. Very dilute dispersions of the present composition are generally not produced and shipped due to the shipping cost associated with shipping water. The composition of the present invention is preferably produced and shipped as a concentrate. The upper limit of the total solids content of the present composition is limited to the solubility or dispersibility of the solid components a), b), c), and d), along with the resulting stability of this concentrate. This upper limit is around 40 weight % solids or below. The lower limits are a factor on shipping cost of water but a concentrate with at least 5 weight % and no more solids is preferred to 30 weight %, containing 70 to 95 weight % water.

Water is the cheapest component of the present composition. Therefore, if a dilute concentration is all that is needed to clean the metal pipes of a system the concentrate should be significantly diluted with water during application.

The relative ratios or amount of each solid component can vary widely depending on desired outcome verses costs. Generally the solids of the aqueous dispersion are present in a relative solids concentration such that, said inorganic reducing agent of a) is present in a concentration of about 30 to about 95 weight %, preferably about 70 to about 90 weight %; said chelating agent of b) is present in a concentration of about 1 to about 50 weight %, preferably about 5 to about 25 weight %; said low foam penetrating surfactant of c) is present in a concentration of about 0.05 to about 5 weight %, preferably about 0.1 to about 2.5 weight %; said water soluble polymeric dispersant of d) is present in a concentration of about 1 to about 30 weight %, preferably about 2 to about 10 weight %, all based on solids at 100 weight %.

Of all the solid components of the composition of the present invention, the inorganic reducing agent a) is by far the cheapest component. Thus, higher amounts of the other three solid components might be more effective, while adequate cleaning is accomplished at lower concentrations. The most preferred composition of the present invention contains said inorganic reducing agent of a) in a concentration of about 85 weight %; said chelating agent of b) in a concentration of about 10 weight %; said low foam penetrating surfactant of c) in a concentration of about 1 weight %; and said water soluble polymeric dispersant of d) in a concentration of about 4 weight %.

The hydrotrope is an optional additional component that is preferably present in the composition of the present invention. The amount of hydrotrope that is in the composition of the present invention generally varies between about 0.5 and about 5 weight %, preferably between about 1 and about 4 weight %, with an amount of about 2–3 weight % being most preferred. The amount of hydrotrope varies depending upon the amount of the low foam penetrating surfactant since it is used to disperse this component in the aqueous composition.

The rust, corrosion, and/or scale removing composition of the present invention can be use by itself or can be used in combinations with other water treatment agents that can be added directly into the aqueous composition. These include, for example, biocides, corrosion inhibitors, phosphonates, phosphates, yellow metal corrosion inhibitors, pH regulators, scale inhibitors, other dispersants, oxygen scavengers, and the like and mixtures thereof.

The process for removing rust and/or scale from an aqueous system according to the present invention comprises treating said aqueous system with an effective amount of a mixture comprising: a) an inorganic reducing agent; b) a chelating agent; c) a low foam penetrating surfactant; and d) a water soluble polymeric dispersant selected from anionic and nonionic polymers. The process according to the present invention is preferably in said aqueous system at a pH between 2 and 10, preferably 4 to 8, with a pH of about 5 to 6 being more preferred.

The aqueous system that can be cleaned and treated with the inventive composition by the process of the present invention is selected from the group consisting of boiler systems, cooling tower systems, heat exchanger systems, desalination systems, paper mills, heating/cooling systems, fire service water, reactors and metal parts, including new construction of the above. At high product concentrations, these systems are preferably shut down for cleaning before introducing the composition of the present invention and are not cleaned with the present invention during operation.

The aqueous system is first shut down and drained of the system water. The composition of the present invention is then introduced in to the system (neat or diluted) into all lines, pipes, and containers and circulated. After the system lines are adequately cleaned, the composition along with contaminants is removed and drained from the system. The system is then preferably rinsed with water and then the system fluid is reintroduced and the system is put into operation. The rust and/or scale removal composition according to the present invention can be used in aqueous systems and operated at high temperatures and pressures. However, the composition of the present invention is preferably circulated in the system at atmospheric pressure at standard system operating temperatures that can range from 10° C. to 95° C. This application temperature is preferably between about 25° C. to about 85° C., more preferably between about 40° C. to about 75° C., with a temperature between about 50° C. to about 60° C. being most preferred.

Usage rates are determined by the amounts of iron oxides to be removed, but an effective amount of the inventive composition that is present in the system during cleaning can vary between about 10 ppm to about 90% of the total fluid in the system. Preferred dosage rates are 0.01% to 50%, more preferred are 0.05% to 30%, with most preferred being 0.1% to 15%.

The following examples are provided to illustrate the present invention but are not intended to limit the reasonable scope thereof.

EXAMPLES

Test Method

Carbon steel coupons were corroded for 5 days in tap water at a pH of 7. They were dried in air, weighed and placed in 8 liter cells containing 4×Pittsburgh water. The cleaning product was added and allowed to clean for 22 hrs. at pH=5 at 60° C. The cleaned coupon was removed, rinsed in de-ionized water and then, acetone. The coupon was dried in an oven at 60° C. for 15 min., cooled and weighed. The difference between the corroded weight and the final weight is a measure of the corrosion products removed from the coupon. In addition, the surface of the metal is reduced to a matte black magnetite finish.

The following table contains data using the above classes of reactants demonstrating the efficacy of the invention:

| (a) Reducer | (b) Chelant | (d) Dispersant | (c) Penetrant | Dose (%) | Weight loss (g) | Diss. Fe (mg/l) | Susp. Fe (mg/l) | Initial pH |
|---|---|---|---|---|---|---|---|---|
| NaHSO$_3$ | Na$_4$EDTA | AA/AMPS | PEO/PPO +** hydrotrope | 0.1 | 2.994 | | | 6 |
| NaHSO$_3$ | Na$_4$EDTA | AA/AMPS | PEO alcohol* + hydrotrope | 0.1 | 0.736 | 55 | 15 | 8 |
| NaHSO$_3$ | Na$_4$EDTA | AA/AMPS | PEO alcohol* + hydrotrope | 0.1 | 1.364 | 190 | 30 | 7 |
| NaHSO$_3$ | Na$_4$EDTA | AA/SPME/MA | PEO alcohol* + hydrotrope | 0.1 | 0.728 | 75 | 20 | 8 |
| Na$_2$SO$_3$ | Na$_4$EDTA | AA/SPME/MA | PEO alcohol* + hyrotrope | | | | | |
| Na$_2$SO$_3$ | Na 3 citrate | AA/SPME/MA | PEO alcohol* + hyrotrope | | | | | |
| Na$_2$S2O3 | Na$_4$EDTA | AA/SPME/MA | PEO alcohol* + hyrotrope | | | | | |

*TRITON DF-16
**PLURONIC P-103

The major advantage of this approach over the previous partial methods is that the metal oxide is removed and the metal surface is passivated at the same time. No flash corrosion occurs. The time element required is less in comparison with other neutral pH cleaners, especially those of the alkylbenzene sulfonate type. Although the cleaning time is somewhat dose related, the time required is hours rather than weeks. The advantage over chelant based, or acid based cleaners is that the chelant/acid is never in high enough concentration to attack the bare metal surface. The reduction and passivation of the metal surface also help to mitigate this process. Another advantage of this composition/method is that the byproducts of this process contains sulfate, chelated iron, dispersed iron oxide solids, none of which are hazardous to the environment. These byproducts pose no disposal problems.

What is claimed is:

1. A rust and/or scale removal composition comprising an aqueous dispersion of solids in water wherein said composition consists essentially of:

I) from about 0.1 to about 40 weight percent solids; and

II) from about 60 to about 99.9 weight percent water;

wherein said solids comprise:
a) from about 30 to about 95 weight percent of an inorganic reducing agent;
b) from about 1 to about 50 weight percent of a chelating agent;
c) from about 0.05 to about 5 weight percent of a low foam penetrating surfactant;
d) from about 1 to about 30 weight percent of a water soluble polymeric dispersant selected from the group consisting of copolymers and terpolymers of acrylic acid/3-acrylamido, 2-methyl propyl sulfonic acid; acrylic acid/sulfonated styrene; and acrylic acid sulfophenoxy methallyl ether/maleic acid, and salts thereof, and wherein said water soluble polymeric dispersant has a weight average molecular weight ranging from about 500 to about 25,000.

2. A rust and/or scale removal composition comprising an aqueous dispersion of solids in water wherein said composition consists essentially of:
I) from about 0.1 to about 40 weight percent solids; and
II) from about 60 to about 99.9 weight percent water;
wherein said solids comprise:
a) from about 30 to about 95 weight percent of an inorganic reducing agent;
b) from about 1 to about 50 weight percent of a chelating agent;
c) from about 0.05 to about 5 weight percent of a low foam penetrating surfactant;
d) from about 1 to about 30 weight percent of a water soluble polymeric dispersant; and
e) from about 0.5 and about 5 weight percent of a hydrotrope selected from the group consisting of phosphate esters, phosphated alcohol ethoxylate, phosphated linear alcohol, and phosphated alkylphenol ethoxylate.

3. The composition according to claim 1 wherein said inorganic reducing agents are selected from the group consisting of sulfites, thiosulfites, persulfates, and peridates and the ammonium, potassium and sodium salts thereof.

4. The composition according to claim 2 wherein said inorganic reducing agents are selected from the group consisting of sulfites, thiosulfites, persulfates, and peridates and the ammonium, potassium and sodium salts thereof.

5. The composition according to claim 1 wherein said chelating agent is selected from the group consisting of ethylene diamine tetraacetic acid, maleic acid, oxalic acid, citric acid, and their salts.

6. The composition according to claim 5 wherein said chelating agent is the sodium salt of ethylene diamine tetraacetic acid.

7. The composition according to claim 2 wherein said chelating agent is selected from the group consisting of ethylene diamine tetraacetic acid, maleic acid, oxalic acid, citric acid, and their salts.

8. The composition according to claim 7 wherein said chelating agent is the sodium salt of ethylene diamine tetraacetic acid.

9. The composition according to claim 1 wherein said low foam penetrating surfactant is a nonionic surfactant and is selected from the group consisting of ethylene oxide polymers, propylene oxide polymers, ethylene oxide/propylene oxide copolymers and polyethoxylated alkylated alcohols.

10. The composition according to claim 2 wherein said low foam penetrating surfactant is a nonionic surfactant and is selected from the group consisting of ethylene oxide polymers, propylene oxide polymers, ethylene oxide/propylene oxide copolymers and polyethoxylated alkylated alcohols.

11. The composition according to claim 2 wherein said water soluble polymeric dispersant has a weight average molecular weight ranging from about 500 to about 25,000 and is selected from the group consisting of the homopolymers, copolymers, and terpolymers of the monomers acrylamide; acrylic acid; methacrylic acid; 2-acrylamido-2-methyl propylsulfonic acid; 3-acrylamido-2-methyl propylsulfonic acid; 2-hydroxy propylacrylate; sulfonated styrene; itaconic acid; polyethylene glycol mono methacrylate; t-butylacrylamide; vinyl sulfonate; hydroxypropyl acrylate; 3-allyloxy-2-hydroxy propylsulfonic acid; vinyl phosphonic acid; sulfophenoxy methallyl ether; maleic acid and salts thereof.

12. The composition of claim 2 wherein said hydrotrope is phosphated alkylphenol ethoxylate.

13. A process for removing rust and/or scale from an aqueous system comprising treating said aqueous system with from about 10 ppm to about 90% of the total fluid in the system of a rust and/or scale removal composition comprising an aqueous dispersion of solids in water wherein said composition consists essentially of:
I) from about 0.1 to about 40 weight percent solids; and
II) from about 60 to about 99.9 weight percent water;
wherein said solids comprise:
a) from about 30 to about 95 weight percent of an inorganic reducing agent;
b) from about 1 to about 50 weight percent of a chelating agent;
c) from about 0.05 to about 5 weight percent of a low foam penetrating surfactant;
d) from about 1 to about 30 weight percent of a water soluble polymeric dispersant selected from the group consisting of copolymers and terpolymers of acrylic acid/3-acrylamido, 2-methyl propyl sulfonic acid; acrylic acid/sulfonated styrene; and acrylic acid sulfophenoxy methallyl ether/maleic acid, and salts thereof, and wherein said water soluble polymeric dispersant has a weight average molecular weight ranging from about 500 to about 25,000.

14. A process for removing rust and/or scale from an aqueous system comprising treating said aqueous system with from about 10 ppm to about 90% of the total fluid in the system of a rust and/or scale removal composition comprising an aqueous dispersion of solids in water wherein said composition consists essentially of:
I) from about 0.1 to about 40 weight percent solids; and
II) from about 60 to about 99.9 weight percent water;
wherein said solids comprise:
a) from about 30 to about 95 weight percent of an inorganic reducing agent;
b) from about 1 to about 50 weight percent of a chelating agent;
c) from about 0.05 to about 5 weight percent of a low foam penetrating surfactant;
d) from about 1 to about 30 weight percent of a water soluble polymeric dispersant; and
e) from about 0.5 and about 5 weight percent of a hydrotrope selected from the group consisting of phosphate esters, phosphated alcohol ethoxylate, phosphated linear alcohol, and phosphated alkylphenol ethoxylated.

* * * * *